United States Patent

[11] 3,609,474

[72] Inventor Britton T. Vincent, Jr.
Dallas, Tex.

[21] Appl. No. 871,602
[22] Filed Nov. 10, 1969
[45] Patented Sept. 28, 1971
[73] Assignee Texas Instruments Incorporated
Dallas, Tex.
Continuation of application Ser. No. 649,320, June 27, 1967, now abandoned.

[54] SEMICONDUCTOR WITH IMPROVED HEAT DISSIPATION CHARACTERISTICS
11 Claims, 9 Drawing Figs.

[52] U.S. Cl. .......... 317/235 R, 317/234 R, 317/234 M, 317/234 N, 317/234 A, 317/234 U, 317/235 Z, 317/235 AM
[51] Int. Cl. .......... H01p 5/00
[50] Field of Search .......... 317/234, 5/5.2

[56] References Cited

UNITED STATES PATENTS

| | | | |
|---|---|---|---|
| 3,044,147 | 7/1962 | Armstrong .......... | 29/25.3 |
| 3,290,570 | 12/1966 | Cunningham et al. .......... | 317/240 |
| 3,383,568 | 5/1968 | Cunningham et al. .......... | 317/235 |
| 3,370,207 | 2/1968 | Fabel et al. .......... | 317/234 |
| 3,290,565 | 12/1966 | Hastings .......... | 317/234 |
| 2,858,489 | 10/1958 | Henkels .......... | 317/235 |

FOREIGN PATENTS

| | | | |
|---|---|---|---|
| 954,534 | 4/1964 | Great Britain .......... | 317/234 X |

*Primary Examiner*—John W. Huckert
*Assistant Examiner*—B. Estrin

ABSTRACT: Disclosed is a semiconductor device, such as a transistor, including an extended emitter contact with one portion thereof having a small dimension for contact to the emitter region of the device, and another relatively large heat dissipation portion overlying the base region of the transistor for heat sinking purposes. The emitter contact is separated from the base contact by a relatively thick layer of insulation which avoids degrading the electrical parameters of the device.

INVENTOR
Britton T. Vincent Jr.

BY [signature]
ATTORNEY

SEMICONDUCTOR WITH IMPROVED HEAT DISSIPATION CHARACTERISTICS

This is a continuation of Ser. No. 649,320 filed June 27, 1967, now abandoned.

This invention relates to semiconductor devices, and more particularly to a transistor having an emitter contact system for heat dissipation which does not adversely affect the electrical parameters of the transistor.

In all semiconductor power devices much of the heat generated by their operation must be removed to prevent degradation and possible destruction of the devices. The removal of the generated heat from a nonplanar or bottom-side collector transistor, for example, is usually effected by heat sinking the collector contact, which collector is located on the opposite face of the substrate from the emitter and base contacts. Heat sinking the collector contact of a planar or top-side collector transistor, on the other hand, is not to effective due to the location of the collector contact on the same surface with the emitter and base contacts. Therefore, when heat sinking is needed for a planar transistor, or when the collector contact of a nonplanar transistor is not capable of removing all the heat generated, as would be the case, for example, in a microwave power transistor of either the planar or nonplanar variety, another thermal path from the device becomes necessary.

In brief, the invention involves the extension of the metal emitter contact of a transistor from the very small portion thereof in contact with the emitter region to a larger heat dissipating portion on a thick dielectric layer overlying the base region. The extended emitter contact presents a relatively large thermal path from the emitter region and acts either as a relatively large radiation surface or as a contact surface for a metal heat sink.

As is well known, when the emitter contact overlies the base region, as in the present invention, there will be a high shunt capacitance between the contact and the region if the emitter contact is spaced closely to the base region. In further accordance with the present invention, however, this high shunt capacitance is reduced to a usable value by the interposition of a relatively thick layer of dielectric material between the base region and the overlying portion of the emitter contact.

Accordingly, an object of this invention is a semiconductor device with an extended emitter contact having a relatively large heat dissipating portion overlying a substantial part of the base region without, however, said heat dissipating portion degrading the electrical parameters of the device.

The novel features believed to be characteristic of the invention are set forth with particularity in the appended claims.

Figures 8, 9:
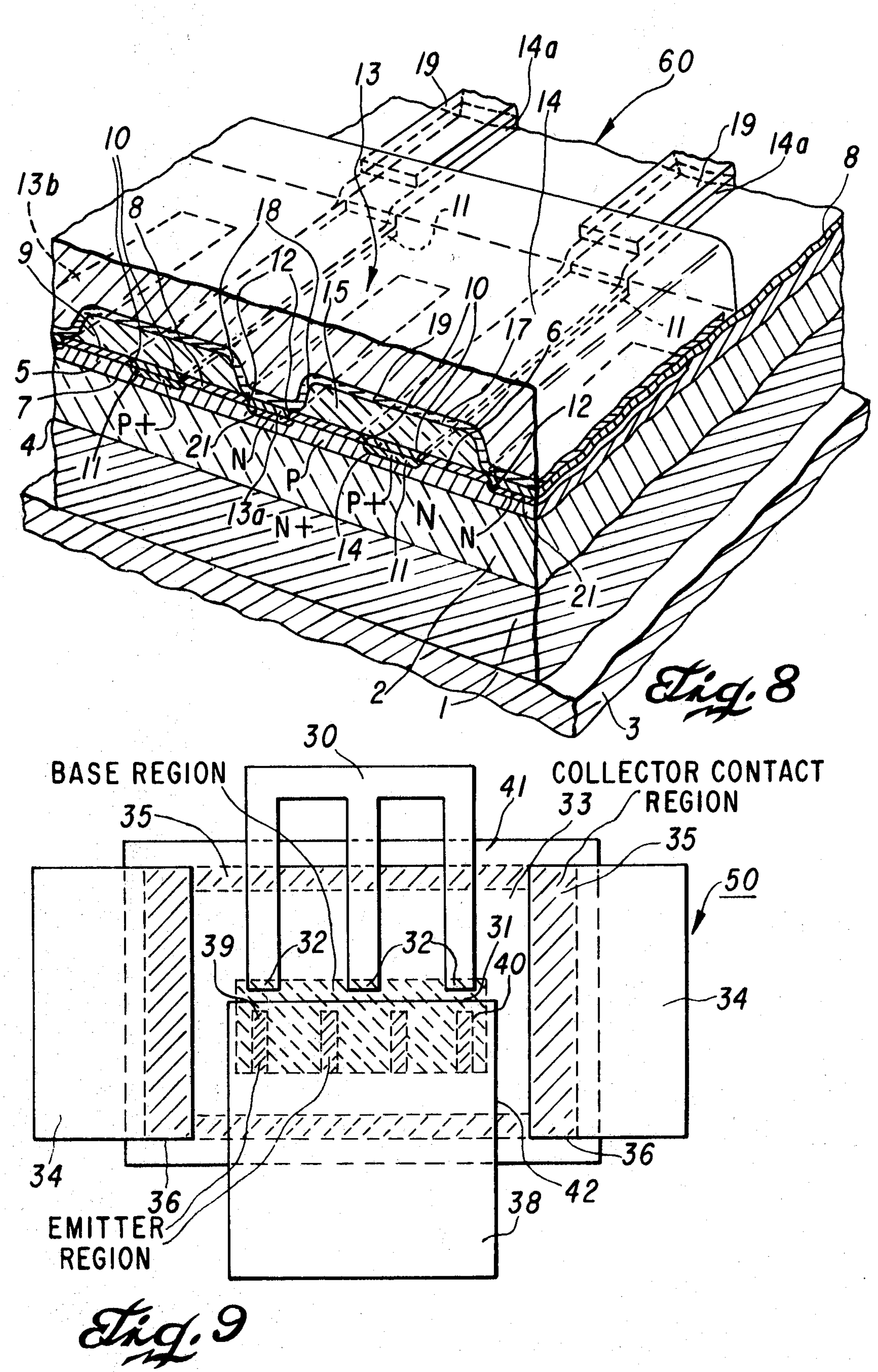

The invention itself, however, as well as further objects and advantages thereof may be best understood by reference to the following detailed description, when read in conjunction with the accompanying drawings wherein:

FIGS 1–7 are sectional views illustrating the steps taken according to the invention to fabricate the transistor illustrated in FIG. 8.

Figures 1, 2, 3, 4:
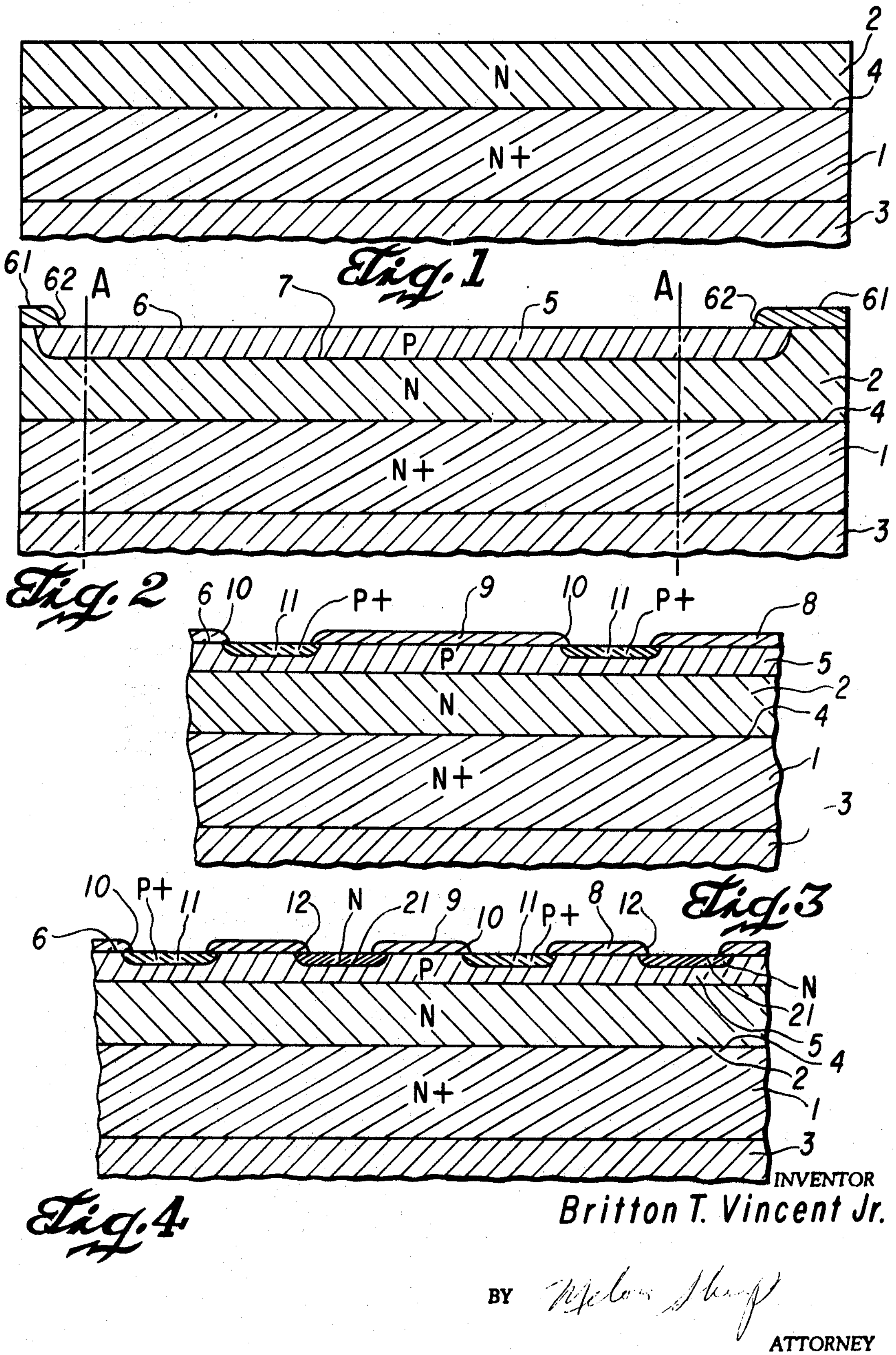

It should be noted that FIG. 1 is a cross-sectional representation of the semiconductor substrate after certain steps of the invention have been performed, and on which the transistor of the invention is to be eventually constructed, that FIG. 2 represents the same substrate after certain other steps of the invention have been performed while FIGS. 3–7 are limited to that portion of the substrate between lines A—A of FIG. 2.

FIG. 8 is an isometric view, partly in section, of a portion of a nonplanar microwave power transistor with an interdigitated base and emitter contact configuration, illustrating the structural features of the extended emitter contact according to the invention, and FIG. 9 is a top view of a planar microwave power transistor with a beam-lead-type configuration, illustrating another use of the extended emitter contact according to the invention.

Identical parts, regions, layers and contacts throughout FIGS. 1–8 have identical designations.

Referring now to the figures of the drawings, FIG. 8 illustrates one typical example of a transistor, generally designated by the numeral 60, having an extended emitter contact. The transistor 60 is a nonplanar, microwave NPN power transistor having interdigitated emitter and base contacts. Transistor 60, as shown in FIG. 8, and transistor 50, as shown in FIG. 9, are described by way of illustration only in order to fully describe the broad concept of the invention and not by way of limitation.

To better describe the salient features of the transistor 60 as shown in FIG. 8, the process steps used in fabricating it are illustrated in FIGS 1–7. To emphasize the individual parts of the device according to the invention, the figures have not been drawn to scale.

Referring now to FIG. 1, N+ conductivity-type silicon is used as the starting substrate 1 in order to furnish a low-resistance path from the collector region 2 to a support or heat sink 3, such as a header as shown in said figure. The N conductivity-type collector region 2 is formed by epitaxially. depositing N conductivity-type silicon on the surface 4 of the N+ conductivity-type substrate 1 by conventional epitaxial deposition methods.

Considering FIG. 2, a relatively thin insulating layer 61 of about 2,000 A. in thickness of, for example, silicon oxide, is formed on the surface of the collector region 2. A suitable layer of silicon oxide can be formed by conventional thermal growth or pyrolitic deposition methods.

FIG. 2 does not show the entire insulting layer 61, but only the portion of it which remains after the next step of the invention is performed and now to be described. The surface of the silicon oxide layer is then covered with a layer of photoresistive material such as Kmer, manufactured by Eastman Kodak, which is patterned to form a mask that exposes the portions of the surface of the silicon oxide layer 61 to be removed. The surface of the mask (not shown) and the exposed portion of the surface of the silicon oxide layer are subjected to an etching condition for a period of time sufficient to form an opening 62 in the silicon oxide layer over the desired portion of the collector region 2. The mask is removed and the base region 5 is formed by the diffusion of a P conductivity-type impurity modifier into the exposed portion of the surface of the N conductivity-type collector region 2 to form the base 5 and the base-collector junction 7, as shown in FIG. 2. The upper surface of the N conductivity-type layer 2 now lies underneath and contiguous with the P conductivity-type base 5, having upper surface 6. The epitaxial deposition, diffusion processes and metal evaporation techniques used to form the transistor described herein are so well known in the art that they will not be further detailed. Only the portion of the substrate, including a portion of the collector region 2 and base region 5 between the reference lines A—A are shown in subsequent figures as previously indicated.

Proceeding now to FIG. 3, another thin insulating layer 8 of about 2,000 A. in thickness of silicon oxide, for example, is formed on the surface 6 of the base region 5.

As previously indicated with regard to the structure shown in FIG. 2, entire insulating layer 8 is not shown in FIG. 3 but only that portion of it which remains after the next step of the invention is performed and now to be described. The surface 9 of the silicon oxide layer 8 is covered with a photoresistive mask (not shown) that exposes the portions of the silicon oxide layer 8 to be removed in order to subsequently form the base contact regions 11. The mask and exposed portions of the oxide layer 8 are subjected to an etching condition for a period of time sufficient to form the windows 10 in the oxide layer 8. The mask is removed and P+ conductivity-type base contact regions 11 are formed by diffusing a P conductivity-type impurity modifier into the areas of the surface 6 of the base region 5 exposed by the windows 10, as shown in FIG. 3. The thin layer of silicon oxide (not shown) formed on the surface of the base contact regions 11 during the diffusion operation is used to mask those regions during the following emitter diffusion step.

Considering FIG. 4, the surfaces of the silicon oxide layer 8 and the thin layer of oxide over the portions of the base contact regions 11 exposed by the windows 10 are covered with a photosensitive mask (not shown) which exposes the portions of the silicon oxide layer 8 overlying the portions of the base region 5 in which N conductivity-type emitter regions 21 are to be formed. The mask and the exposed surface of the silicon oxide layer 8 are subjected to an etching condition for a period of time sufficient to form the windows 12. The mask is removed and the N conductivity-type emitter regions 21 are formed through the windows 12 by diffusing an N conductivity-type modifier into the portion of the surface 6 of the base region 5 exposed by the windows 12, as shown in FIG. 4.

Figures 5, 6, 7:
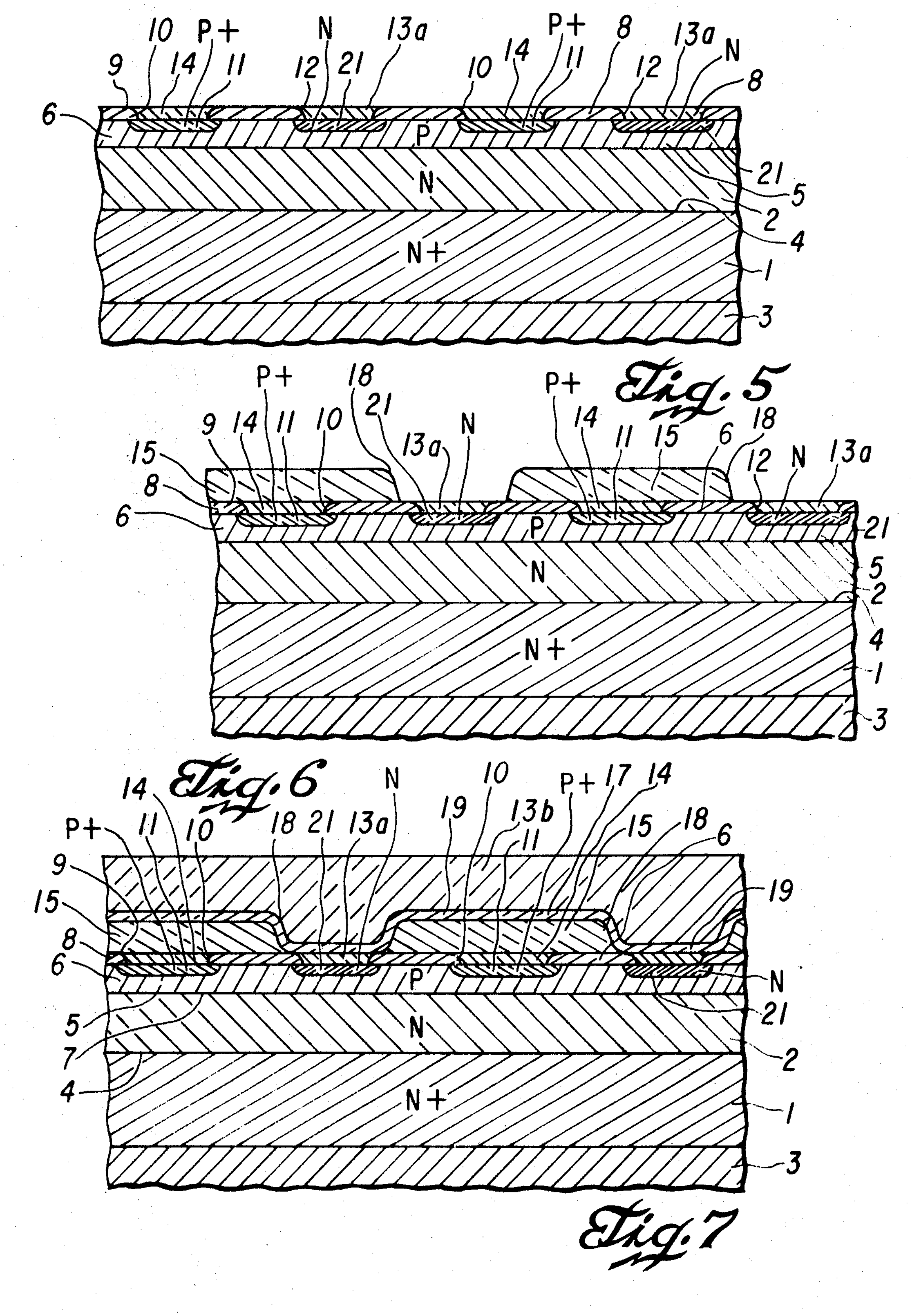

As shown in FIG. 5, the surface 9 of the silicon oxide layer 8 and the oxide layers (not shown) over the emitter regions 21 and base contact regions 11 formed during the base and emitter diffusion steps, are covered with a mask (not shown) exposing the desired portions of the surface of the oxide-covered emitter regions 21 and the base contact regions 11 within the windows 12 and 10, respectively. For the purpose of reopening the windows 12 and 10, the surface of the mask and exposed surfaces of the oxide layers covering the windows 12 and 10 are subjected to an etching through the for a period of time sufficient to reexpose the desired surface of the emitter and base contact regions. The mask is then removed and dual layers of metal **13*a* composed of a bottom film of molybdenum or chromium and a top film of gold, or, instead, multilayers composed of a bottom film of molybdenum or chromium, a middle film of gold and a top film of molybdenum or chromium, are selectively deposited by conventional evaporation techniques through the windows 12 to form the contact portions 13*a* of the extended emitter, the other portion of said emitter being 13*b* as viewed in FIG. 7 and shortly to be described. Similar layers of metal are deposited through the windows 10 to form the base contacts 14, and on desired portions of the surface 9 of the silicon oxide layer 8 to form expanded base contacts 14*a* (expanded base contacts 14*a* being shown only in FIG. 8), if expanded contacts are desired. The deposition thickness of the different layers of metal is so controlled that the windows 10 and 12 are filled about to the surface 9 of the silicon oxide layer 8**. A typical metal system, for example, is composed of about 5 microinches of molybdenum or chromium, about 30 microinches of gold and about 5 microinches of molybdenum or chromium. Such a metal system provides a good ohmic contact with the silicon surface and good adherence to subsequent oxide depositions.

Proceeding now to FIG. 6, thick dielectric layer 15 of an insulating material, such as silicon oxide, for example, is deposited by such conventional techniques as electron gun or sputtering methods on the entire upper surface of the structure partially shown in FIG. 6, including the surface 9 of the silicon oxide layer 8, the surfaces of the emitter contact portions **13*a*, the base contact 14 and the expanded base contacts 14*a*, as shown in FIG. 8. A typical thickness of the dielectric layer 15 is about 10,000 A. The surface of the dielectric layer is then covered with a photoresistive mask patterned to expose those portions of the dielectric layer which overlie the emitter regions 21 and certain portions that overlie the expanded base contacts 14*a*. (See FIG. 8). The mask and the exposed portions of the surface of the dielectric layer 15 are subjected to an etching condition for a period of time sufficient to etch the windows 18 in the dielectric layer 15 which expose the portions 13*a* of the extended emitter contact 13 and to etch the portion (not shown) of the dielectric layer 15 overlying the general area around the expanded base metal contacts 14*a***.

Turning now to FIGS. 7 and 8, the mask is removed and a thin metal dual layer 19, composed of a bottom film of a metal such as chromium or molybdenum of about 400 A. in thickness and a top film of gold of about 2,000–3,000 A. in thickness, is evaporated and deposited on the entire surface of the structure, including the surface of the dielectric layer 15, the surface of the expanded base contacts **14*a* (shown only in FIG. 8) and the surface of the exposed portion of the silicon oxide layer 8 as shown only in FIG. 8. A very thick layer of gold, or if cost is a factor, a thick bottom film of copper with a thin top film of gold, is selectively plated on the surface of the metal layer 19 overlying the base region 5 to form the emitter portion 13*b* to a thickness of about 0.5 mil. Where a thick expanded base contact is desired, as in a beam-type configuration, for example, the expanded base contacts 14*a* would also be built up by the thick metal layer on the dual layer 19**.

In the method of forming the transistor 60 as described in conjunction with FIGS. 1–7, the expanded portions **14*a* of the base contacts are not covered with the thick metal layer such as used in the extended emitter contact 13*b* as shown in FIG. 8. Instead, wire connections (not shown) are made to the metal layer 19 on the expanded base contacts 14*a*. The portions of the metal layer 19 neither covered by the heavy metal layer forming the extended emitter contact 13*b* nor lying on the expanded base contacts 14*a*** are removed by selective etching.

The emitter contact portion **13*b* extends the emitter contact 13 over substantially all of the area of the base region. Ohmic contact is made to the very small-sized emitter regions 21 by the emitter contact portions 13*a*. The expanded emitter contact portion 13*b*** covers a relatively large area overlying the base region, thus presenting a relatively large radiation or eat sinking surface.

A fundamental concern of having emitter contact overlying the base region of a transistor is the undesirable shunt capacitance. This capacitance, in the case of a transistor with an extended emitter contact, is the combination of two different capacitances, the capacitance between the emitter region 21 and the base region 5, and the capacitance between the emitter contact 13 and the base contact 14. The following calculations show that the reactance due to this total capacitance is high enough compared to the input impedance of the intrinsic transistor itself as to have negligible effect on the performance of the device well up into the microwave frequency range. For example, a typical microwave power transistor has a base diffusion area of approximately 95 $mils^2$ and an input impedance at the device terminals of approximately 4 ohms at 2.25 GHz. The total area contributing to the base-emitter capacitance, corresponding to about two-thirds of the 95 $mils^2$ base diffusion area, is about 64 $mils^2$. Assuming a dielectric thickness of 10,000 A., and $SiO_2$ as the dielectric with a dielectric constant of about 3.78, the total capacitance is about 0.0216 pf./$mil^2$.

$$\text{Total capacitance} = 0.0216 \text{ pf./mil}^2 \times 64 \text{ mils}^2 \approx 1.4 \text{ pf.}$$

Total reactance at 2.25 gHz.

$$\approx \frac{10^3}{2\pi \times 2.25 \text{ gHz. } 1.4 \text{ pf.}} \approx 50.5 \text{ ohms}$$

Thus, the reactance of the shunt capacitance (50 ohms) is greater than 10 times the input impedance (4 ohms) of the transistor itself at 2.25 GHZ. and would have even a greater ratio at lower frequencies. Hence, the extended emitter contact **13*b*** over the entire base diffusion area has negligible effect on both low- and high-frequency performances of the transistor.

The top view of a beam-leaded-type microwave poser transistor 50 with an extended emitter contact is shown in FIG. 9. The base contact 30 makes ohmic connection to the base region 31 through windows 32 in the silicon oxide layer 33. The collector contact 34 makes ohmic connection to the collector region 35 through windows 36 in the silicon oxide layer 33. The extended emitter contact 38, overlying the thick dielectric layer 42 made as described in conjunction with FIGS. 1–7, makes ohmic connection to the emitter regions 39 through the windows 40 in the dielectric layer 42 and the silicon oxide layer 33. In a beam-leaded device, the silicon substrate is etched away except for the material within the remaining substrate area 41, thus leaving portions of the base contact 30, the collector contact 34 and the emitter contact 38 extending free from the remainder of the silicon substrate 41.

Although preferred embodiments of the invention have been described in detail, it is to be understood that various changes, substitutions, and alterations can be made therein without departing from the spirit and scope of the invention as defined by the appended claims.

I claim:

1. A semiconductor device having relatively high heat dissipation characteristics, comprising in combination:
a. a semiconductor substrate of one conductivity type;
b. a plurality of spaced elongated diffused emitter regions of opposite conductivity type formed in said substrate;
c. a plurality of spaced elongated diffused base contact regions of said one conductivity type but of higher conductivity than said one conductivity type formed in said substrate, said base contact regions being alternatively disposed with respect to said emitter regions;
d. an insulating layer overlying said substrate and having a plurality of spaced windows respectively congruent with said emitter and base contact regions;
e. a first plurality of spaced elongated metallic conductors respectively contiguous with and ohmically contacting said emitter regions;
f. a second plurality of spaced elongated metallic conductors respectively contiguous with and ohmically contacting said base contact regions;
g. a corrugated metallic conductor overlying said insulating layer and having a plurality of upper and lower flat areas with spaced inner hollows below each of said upper areas and spaced outer hollows above each of said lower areas, said lower areas respectively making ohmic contact with said first conductors and being interdigitated with said second conductors, and said inner hollows respectively overlying said second conductors;
h. a plurality of islands of dielectric material overlying each of said second conductors and substantially filling the respective inner hollow of said corrugated conductor; and
i. a layer of conductive material overlying and in ohmic connection with said upper areas of said corrugated conductor; and substantially filling each of said upper hollows; wherein
j. the volume of said lower hollows and the space between each of said upper areas of said corrugated conductor and the respective one of said second conductors are relatively large so as to reduce shunt capacity therebetween; and wherein
k. the volume of said upper hollows and the thermal path from each of said emitter regions therethrough are relatively large so as to increase the heat dissipation characteristics of said semiconductor device.

2. The semiconductor device of claim 1 wherein:
a. said substrate includes an epitaxial layer of semiconductor material of said one conductivity type and a support layer of semiconductor material of said opposite conductivity type; and wherein
b. said first and second regions are formed in said epitaxial layer.

3. The semiconductor device of claim 2 wherein:
a. said device is a transistor including collector, base, base contact, and emitter regions; and wherein
b. said support layer and said epitaxial layers are respectively said collector and base regions.

4. The semiconductor device of claim 3 wherein:
a. said second plurality of conductors extend outwardly beyond one edge of the overlying layer of conductive material, corrugated conductor and islands of dielectric material; and wherein
b. said extended second conductors are ohmically connected to respective prongs of a multiprong extended base contact.

5. The semiconductor device of claim 4 wherein:
a. said corrugated conductor extends outwardly in a direction opposite to said extended base contact; and wherein
b. said corrugated conductor is ohmically connected to an extended emitter contact.

6. The semiconductor device of claim 5 and further including a collector contact ohmically connected to said support layers through a window formed in said epitaxial layer.

7. The semiconductor device of claim 1 wherein said insulating layer and said islands of dielectric material are silicon oxide.

8. The semiconductor device of claim 1 wherein said first and second metallic conductors are dual layers of metal composed of a bottom layer of molybdenum or chromium and a top layer of gold.

9. The semiconductor device of claim 1 wherein said first and second metallic conductors are multilayers of metal composed of a bottom layer of molybdenum or chromium, a middle layer of gold and an outer layer of molybdenum or chromium.

10. The semiconductor device of claim 1 wherein:
a. said corrugated metallic conductor is composed of a bottom layer of molybdenum and a top layer of gold: and wherein
b. the lower areas of said bottom layer ohmically contact said emitter regions, and said top layer of the outer areas and upper hollows ohmically contacts said layer of conductive material.

11. The semiconductor device of claim 1 wherein:
a. said layer of conductive material is composed of a relatively thick bottom layer of copper and a relatively thin top layer of gold; and wherein
b. said bottom layer of copper is ohmically contacting the outer areas and upper hollows of said corrugated metallic conductor.